United States Patent
Suri

(10) Patent No.: US 10,044,157 B2
(45) Date of Patent: *Aug. 7, 2018

(54) PORTABLE FURNITURE POWER OUTLET

(71) Applicant: Harpreet Singh Suri, Oviedo, FL (US)

(72) Inventor: Harpreet Singh Suri, Oviedo, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/819,495

(22) Filed: Nov. 21, 2017

(65) Prior Publication Data

US 2018/0090894 A1 Mar. 29, 2018

Related U.S. Application Data

(63) Continuation-in-part of application No. 15/005,055, filed on Jan. 25, 2016, now Pat. No. 9,853,405.

(51) Int. Cl.

| | |
|---|---|
| *H01R 13/60* | (2006.01) |
| *H01R 25/00* | (2006.01) |
| *H01R 13/66* | (2006.01) |
| *H01R 13/447* | (2006.01) |
| *A47B 97/00* | (2006.01) |
| *H02J 7/02* | (2016.01) |
| *H02J 7/00* | (2006.01) |
| *H02J 50/10* | (2016.01) |

(52) U.S. Cl.
CPC .......... *H01R 25/006* (2013.01); *A47B 97/00* (2013.01); *H01R 13/447* (2013.01); *H01R 13/6675* (2013.01); *H02J 7/025* (2013.01); *A47B 2097/003* (2013.01); *H02J 50/10* (2016.02); *H02J 2007/0062* (2013.01)

(58) Field of Classification Search
CPC .... H02J 7/0021; H02J 7/007; H01R 13/6666; H01R 13/6683; H01R 25/006; H01R 13/516; H01R 13/6675; H01R 13/6581; H01H 9/04
USPC ........................................................ 439/535
See application file for complete search history.

(56) References Cited

U.S. PATENT DOCUMENTS

| | | | |
|---|---|---|---|
| 3,259,804 A | 7/1966 | Parstorfer | |
| 7,554,033 B1 * | 6/2009 | Bhosale | H01H 9/04 |
| | | | 174/53 |
| 8,439,692 B1 * | 5/2013 | Oddsen | H01R 25/006 |
| | | | 439/107 |

(Continued)

OTHER PUBLICATIONS https://www.indiegogo.com/projects/couchlet-power-up-your-sofa-usb#/updates; screen shot from Internet Jul. 5, 2017 (1 page).

(Continued)

*Primary Examiner* — Jean F Duverne
(74) *Attorney, Agent, or Firm* — Jason T. Daniel, Esq.; Daniel Law Offices, P.A.

(57) ABSTRACT

A portable furniture power outlet includes a main body having a larger cross dimensional thickness along a top end, and a smaller cross dimensional thickness along a bottom end to form a wedge between two cushions of any piece of furniture. The main body includes a plurality of AC and DC receptacles that are positioned in either a vertical or horizontal orientation. A main body shoulder and a plurality of ridges increase the static friction of the device to prevent movement during use. A cable management system is positioned along the outside surface of the main body, and a transformer that performs wireless device charging is provided within the main body.

16 Claims, 5 Drawing Sheets

(56) References Cited

U.S. PATENT DOCUMENTS

| | | | |
|---|---|---|---|
| 8,758,031 B2* | 6/2014 | Cheng | H05K 5/02 |
| | | | 439/107 |
| 9,368,982 B2 | 6/2016 | Jansen et al. | |
| 9,660,390 B2* | 5/2017 | Xing | H01R 13/6581 |
| 2003/0034167 A1 | 2/2003 | Deland | |
| 2010/0246232 A1* | 9/2010 | Chen | H01R 31/065 |
| | | | 363/146 |
| 2012/0161973 A1 | 6/2012 | Hsu | |
| 2016/0097522 A1 | 4/2016 | Chien | |

OTHER PUBLICATIONS https://shop.quirky.com/collections/at-home/products/magnecharge; downloaded from Internet Dec. 13, 2017 (2pages).

* cited by examiner

PORTABLE FURNITURE POWER OUTLET

CROSS-REFERENCE TO RELATED APPLICATIONS

This application claims the benefit of U.S. application Ser. No. 15/005,055 filed on Jan. 25, 2016, the contents of which are incorporated herein by reference.

TECHNICAL FIELD

The present invention relates generally to extension cords, and more particularly to a portable power outlet that can be removably secured to furniture such as a sofa or chair.

BACKGROUND

The statements in this section merely provide background information related to the present disclosure and may not constitute prior art.

One of the most ubiquitous pieces of furniture found in virtually every home across the globe is a sofa or couch. Sofas typically consist of an upholstered elongated structure having a plurality of cushions that are arranged side-by-side along the length thereof. These cushions typically defining individual seats for the sofa occupants.

Owing to recent advancements in technology, the number of portable electronic devices such as smartphones, music players, tablets and laptop computers, for example, has grown exponentially. As such, many individuals routinely utilize their electronic devices while sitting on a sofa. Unfortunately, when the power level of the device is low or exhausted, it becomes necessary for the user to find a power outlet to charge their device.

Although virtually all residential buildings have at least one AC power wall outlet in each room, the outlets are often hidden by furniture or located some distance from where the user on the couch is seated. When this situation occurs, the user must stretch their power charging cord from their device to the outlet, or utilize an extension cord to do the same.

Although this procedure satisfies the need to provide power to their electronic device, the resulting mess of cords is aesthetically unpleasing, and can be dangerous, as the exposed wires present a tripping hazard to anyone walking near the sofa.

Accordingly, it would be beneficial to provide a portable power outlet for furniture that can be removably positioned along or between the cushions, in order to provide a convenient location for charging portable electronic devices, and without suffering from the drawbacks described above.

SUMMARY OF THE INVENTION

The present invention is directed to a portable furniture power outlet. One embodiment of the present invention can include a main body having a shape and size that is designed to form a wedge between two cushions of any piece of furniture. The main body can include a plurality of AC and DC receptacles for engaging any number of portable electronic devices. Each of the receptacles can be positioned along the main body in either a vertical or horizontal orientation.

The device can also include a shoulder and ridges which can aid in preventing movement of the device during use. A cable management system can be provided along the main body to organize power cables, and a transformer for performing wireless device charging can be provided within the main body.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1:
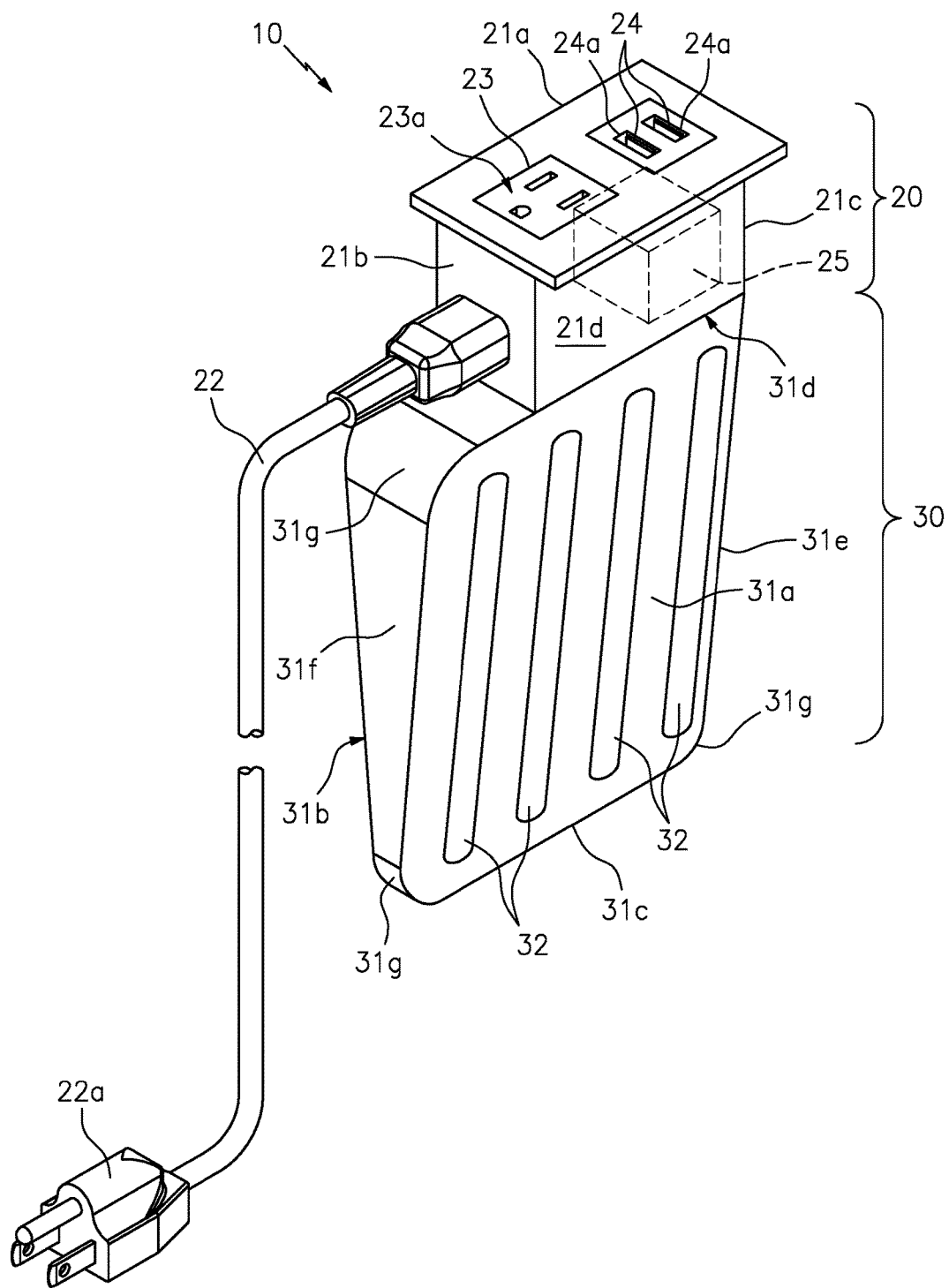
FIG. 1 is a side view of a portable furniture power outlet device that is useful for understanding the inventive concepts disclosed herein.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

As described herein, the term "removably secured," "removably connected," and derivatives thereof shall be used interchangeably to describe a situation wherein two or more objects are joined together in a non-permanent manner so as to allow the same objects to be repeatedly joined and separated. Likewise, the terms "pivotally secured," "rotatably connected," and all derivatives thereof shall be used interchangeably to describe a situation wherein two or more objects are joined together in a manner that allows one or both of the objects to pivot and/or rotate about or in relation to the other object. Several nonlimiting examples include traditional hinge mechanisms, pivoting couplers and/or swivel flanges, for example.

As described herein, a "high friction material" can include any number of different materials that, when secured to the main body, provide a greater level of resistance to movement than what the construction material of the main body affords. Several nonlimiting examples of high friction materials include, rubber silicon and soft foam, for example.

Identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

FIGS. 1-5 illustrate various embodiments of a portable furniture power outlet device 10 that are useful for understanding the inventive concepts disclosed herein. Although shown and described throughout this document as being used in conjunction with the cushions 2 of a sofa 1, this is for illustrative purposes only. To this end, the device can be utilized with any type of furniture (e.g., sofa, chair, bed, vehicular seats, etc.,) having one or more cushions and/or channels into which the device can be positioned. Therefore, the device is not to be construed as limiting to any particular use or industry.

FIG. 1 illustrates one embodiment of the portable power outlet device 10 that includes, essentially, a power module body 20 and an elongated fin member 30. As shown, the power module body 20 can include a frame/housing having any number of different shapes and sizes, including the generally rectangular shape illustrated. The housing can include a top wall 21a and one or more upstanding walls such a rear wall 21b, a front wall 21c and a side wall 21d, for example, defining an internal cavity.

As shown, a power receiver in the form of an elongated power cord 22 and plug 22a can extend outward from the housing 21b and can be connected to a wall outlet (not illustrated). The cord 22 can include any number of different lengths, and will preferably be routed between the cushions 2, and through the rear of the couch 1, so as to allow the majority of the cord to be hidden by the couch itself. Of course, other embodiments of the device 10 are contemplated wherein the plug 22a is secured onto the main body itself, and is configured to engage a removable extension cord. In either instance, any arrangement of components for receiving power from an electrical outlet to the device are contemplated herein.

The power module body can include any number of openings 23 and 24 through which a receptacle 23a and 24a can be located for charging alternating current (AC) or direct current (DC), respectively. In the preferred embodiment, each of the DC receptacles can include or comprise a Universal Serial Bus (USB) connector port for receiving a conventional USB plug, and providing power thereto.

In one embodiment, the power module can also include a built-in transformer 25 which can function to change the voltage (V) from 110 or 220 to low voltages such as 2.5V, 4V and/or 5V, for example. In various embodiments, the transformer can function to automatically sense the voltage requirements of a user device, and automatically adjust the output voltage of the DC connector port(s) to the necessary voltage. Such a feature advantageously allows users to charge one or more devices having different power requirements.

Although illustrated as including AC receptacle(s) and DC receptacle(s) along the top wall 21a, the inventive concepts are not to be construed as limiting to any particular number or type of receptacles/ports, or location(s) along any portion of the power module and/or the fin. As such, any number and type of power outlets can be provided within or along any portion of the device, so as to be able to provide the necessary power requirements for one or more portable electronic devices or other such objects connected to the device 10. In this regard, the transformer 25 can include functionality for performing wireless or induction charging of a portable device. To this end, the transformer can include or comprise two induction coils capable of generating an electromagnetic field that transfers energy from the device 10 to a portable electronic device without requiring the portable device to be physically plugged in.

Figure 2:
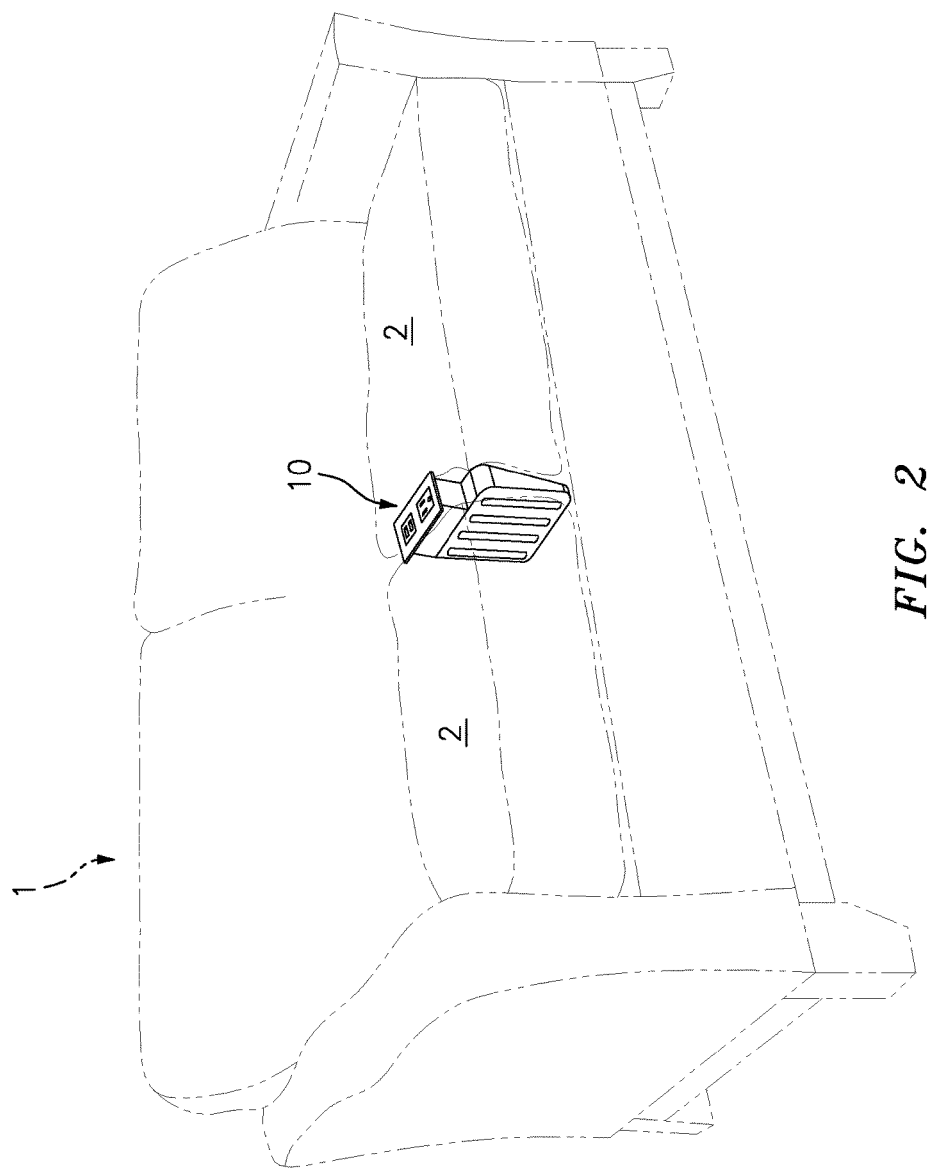
FIG. 2 is a perspective view of the portable furniture power outlet device in operation, in accordance with one embodiment of the invention.

The elongated fin member 30 can be fixedly or pivotally connected to the bottom end of the power module so as to extend downward therefrom, in order to be inserted vertically between the seat cushions 2 of the sofa 1, as shown in FIG. 2. In the preferred embodiment, the fin can be constructed from a lightweight piece of injection molded plastic, for example, and can include a generally wedge-shaped body having a first side surface 31a, a second side surface 31b, a bottom edge 31c, a top edge 31d a front edge 31e and a rear edge 31f. The fin can be constructed so as to be rigid, or can be constructed to be generally malleable/semi-flexible in nature.

In various embodiments, the corners can include radiused edges 31g, in order to prevent the corners from damaging the sofa material. Additionally, a plurality of ridges 32 can be disposed along the first and/or second side surfaces of the fin body. The ridges can be constructed from an identical material as the fin body, or from any number of different high friction materials such as rubber, for example. In either instance, the shape and/or material of the ridges can increase the coefficient of friction between the device and the piece of furniture, in order to assist the fin to remain affixed between the cushions, and to prevent movement of the device.

Figure 3:
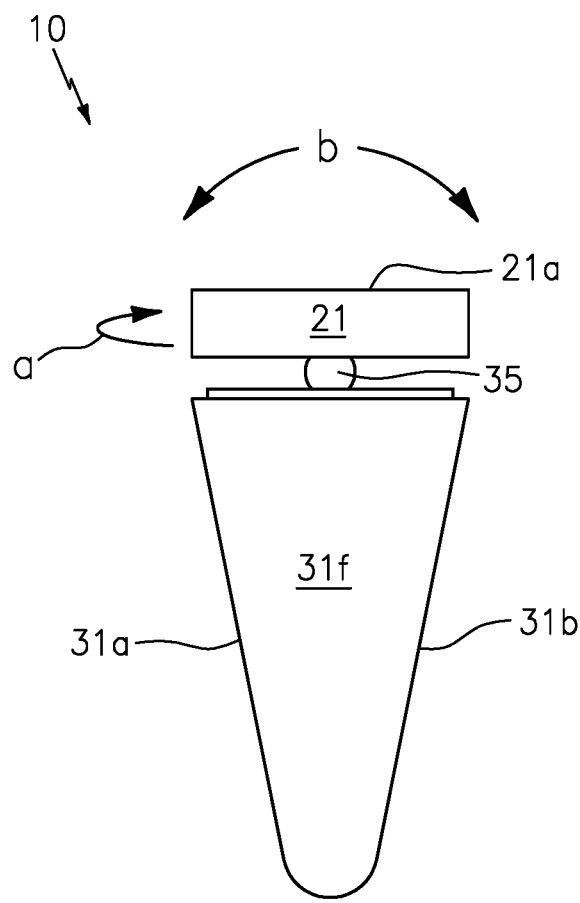
FIG. 3 is a front side view of the portable furniture power outlet device, in accordance with one embodiment of the invention.

As shown in FIG. 3, the fin member 30 can also be pivotally secured to the power module 20. To this end, a connector 35 can be provided to allow a user to rotate the power module 360 degrees horizontally (see arrow a) and/or to pivot the power module vertically (see arrow b). One suitable example of a connector 35 can include a dual axis hinge, as is described in U.S. Pat. No. 7,979,960, the contents of which are incorporated herein by reference. Of course, any number of other connectors capable of allowing rotation and/or pivotal movement are also contemplated.

Although described above as including a particular shape and construction material, this is for illustrative purposes only. To this end, the fin body and/or power module can each include any number of different shapes and sizes, and can be constructed from any number of different materials such as various plastics, wood and/or metal, for example.

Figure 4:
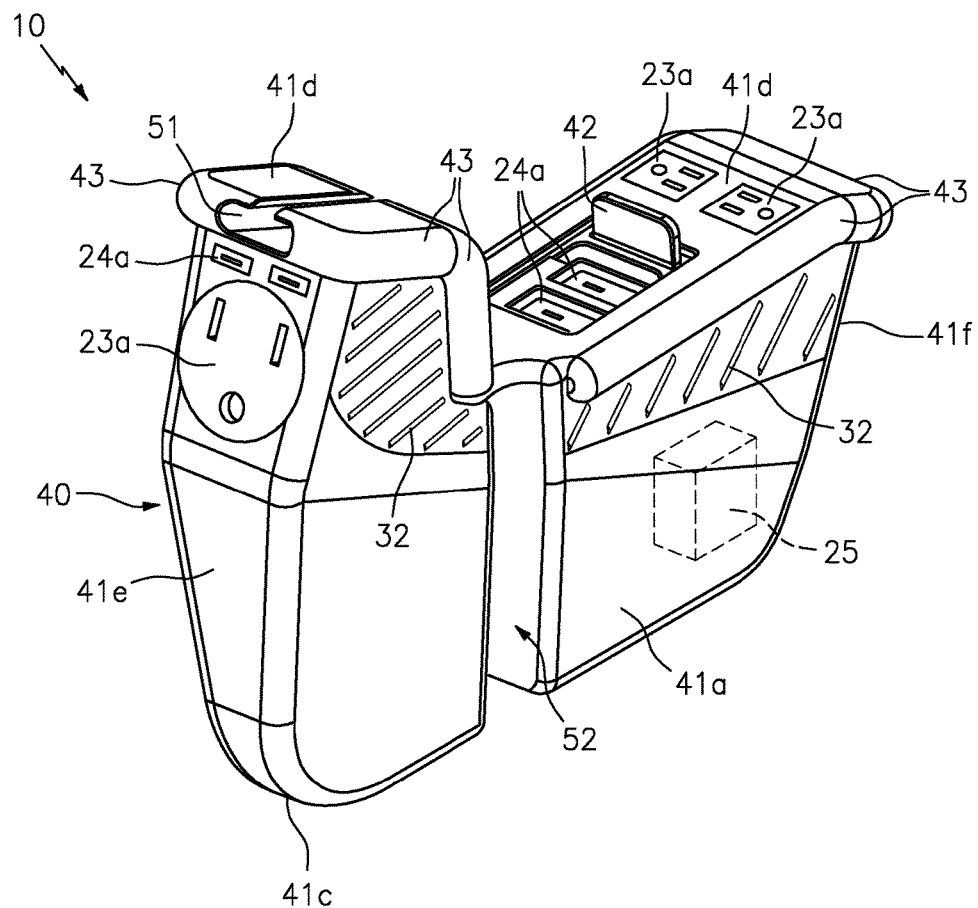
FIG. 4 is a perspective view of the portable furniture power outlet device, in accordance with another embodiment of the invention.
Figure 5:
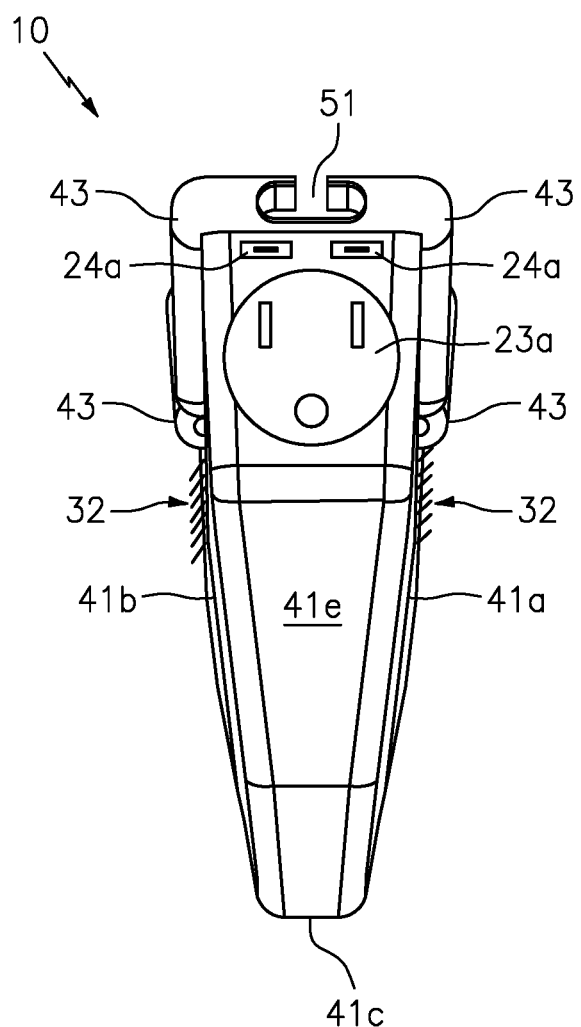
FIG. 5 is a front side view of the portable furniture power outlet device, in accordance with another embodiment of the invention.

FIGS. 4 and 5 illustrate another embodiment of the power outlet device 10 wherein the above described power module and elongated fin member are formed as a unitary main body member 40, having a plurality of receptacle(s) 23a and/or 24a positioned thereon. As shown, the main body 40 can also include a first side surface 41a, a second side surface 41b, a bottom surface 41c, a top surface 41d, a front side 41e and a rear side 41f.

In various embodiments, one or more receptacles 23a and/or 24a can be positioned along the front facing surface 41e so as to engage a power cord in a generally horizontal orientation. Likewise, one or more receptacles 23a and/or 24a can be positioned along the top surface 41d so as to engage a power cord in a generally vertical orientation. In the preferred embodiment, a plurality of DC receptacles 24a can be recessed within the top surface 41d and can be selectively covered by a sliding USB cover 42. In this regard, the sliding USB cover can function to prevent water and dirt from getting into the power receptacles.

In the preferred embodiment, the main body 40 will include a shape and size that aids the device in remaining secured to a piece of furniture such as a couch, for example. To this end, the device can preferably include a generally rectangular cross section that is tapered at the bottom surface. By providing a bottom end that is more narrow than a top end, the main body 40 can form a wedge that allows the bottom portion of the device to be slid between a pair of cushions, while the top end provides a securing force to prevent movement of the device once positioned. Moreover, the height and length of the device provides a stabilizing effect to prevent the device from rotating of otherwise shifting once positioned on the piece of furniture.

Through extensive research and testing, the following dimensions are ideal for ensuring the device will not move, shift, slide, rotate or otherwise move when secured between two cushions of a piece of furniture. The preferred dimensions including a length (e.g., distance between sides 41e and 41f) of approximately 5 inches, a height (e.g., distance between sides 41c and 41d) of approximately 4 inches, and an average width (e.g., distance between sides 41a and 41b) of approximately 1.5 inches.

Although described above with regard to a particular shape, dimensions and/or intended use, the inventive concepts are not limited. To this end, any number of other shapes and dimensions are contemplated for securing the device onto, within or along any piece of furniture.

In one embodiment, the device 10 can include additional stabilization elements which can function to aid the device in remaining wedged to a piece of furniture, as described above. To this end, the device can include a shoulder 43 that extends outward from the main body at a location adjacent to the top end 41d. The shoulder can be formed as an integral component with the main body, or can be a separate element that is secured onto the main body in accordance with known manufacturing techniques. As such, the shoulder may be constructed from any number of different materials, and will preferably be constructed from, or coated with a high friction material such as rubber, for example, to increase the coefficient of friction between the main body and the furniture.

In one embodiment, the device 10 can also include a plurality of the above described ridges 32 that are disposed along the main body 40 at a location adjacent to the top end 41d. Such ridges can preferably extend one-third of the distance from the top surface to the bottom surface, so as to provide additional stabilization to the device. In such an embodiment, the bottom two-thirds of the main body will preferably include a smooth non-textured surface to aid the user in sliding the device between the cushions of the furniture, as described above. Such elements ensure the device can be easily positioned along a piece of furniture, and will remain secured thereto.

In one embodiment, the device 10 can also include a cable management system in the form of a cord channel/T-slot 51 that can be formed along a portion of the top surface 41d, and a pair of indentions 52 that are positioned along the first and second side surfaces 41a and 41b. To this end, channel 51 can function to route any number of cables that are engaged with the receptacles located on the top surface of the main body outward from the device in a horizontal manner. Likewise, indentations 52, combined with the raised front section of the main body provide the user with the ability to wrap any number of cables in a circular orientation about the outside surface of the device, thereby eliminating problems associated with excess cable lengths.

Accordingly, the above described portable furniture power outlet device 10 provides a portable power outlet for furniture that can be removably positioned along or between the cushions thereof, in order to provide a convenient location for charging portable electronic devices.

As described herein, one or more elements of the portable furniture power outlet device 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one or more individually identified components may be formed together as one continuous element, either through manufacturing processes, such as welding, casting, or molding, or through the use of a singular piece of material milled or machined with the aforementioned components forming identifiable sections thereof.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A portable outlet device for furniture, comprising:
   a main body having a top surface, a bottom surface, a front surface, a rear surface, a pair of side surfaces, and an internal cavity;
   a power receiving unit that is configured to receive electrical power from a power supply source; and
   one or more power receptacles that are disposed along the main body;
   wherein the top surface of the main body includes a cross dimensional thickness that is greater than a cross dimensional thickness of the bottom end of the main body, and the main body is configured to be removably wedged between two cushions of a piece of furniture.

2. The device of claim 1, further comprising:
   a shoulder that is secured along the main body at a location adjacent to the top surface.

3. The device of claim 2, wherein the shoulder is constructed from a high friction material and is configured to prevent movement of the main body when secured to a piece of furniture.

4. The device of claim 1, further comprising:
a plurality of ridges that are positioned along an upper portion of the main body.

5. The device of claim 4, wherein the plurality of ridges are constructed from a high friction material and are configured to prevent movement of the main body when secured to a piece of furniture.

6. The device of claim 4, wherein a bottom portion of the main body includes a non-textured surface.

7. The device of claim 1, wherein the one or more power receptacles includes at least one power receptacle that is positioned along the front surface of the main body in a generally vertical orientation; and
at least one power receptacle that is positioned along the top surface of the main body in a generally horizontal orientation.

8. The device of claim 1, wherein the one or more power receptacles includes a plurality of DC power receptacles that are recessed within the top surface of the main body.

9. The device of claim 8, further comprising:
a cover that is slidingly engaged with the main body at a location above the plurality of DC power receptacles, said cover functioning to selectively protect each of the plurality of DC power receptacles when in a closed position.

10. The device of claim 8, further comprising:
a transformer that is positioned within the internal cavity, said transformer functioning to change an AC input voltage to a plurality of different output DC voltages.

11. The device of claim 10, wherein the transformer is configured to sense a voltage requirement of an electronic device that is plugged into one of the plurality of DC power receptacles and to automatically provide the required voltage to the one DC power receptacle.

12. The device of claim 10, wherein the transformer is further configured to perform wireless charging of a portable electronic device.

13. The device of claim 1, further comprising:
a cord channel that is formed along a portion of the top surface of the main body.

14. The device of claim 1, further comprising:
a pair of indentations that are positioned along the pair of side surfaces of the main body, said indentations being configured to position an electrical cord in a circular orientation about an outside surface of the main body.

15. The device of claim 1, further comprising:
a power supply cord that is secured to the power receiving unit.

16. The device of claim 15, wherein the power supply cord is removably secured to the power receiving unit.

* * * * *